Figure 1:
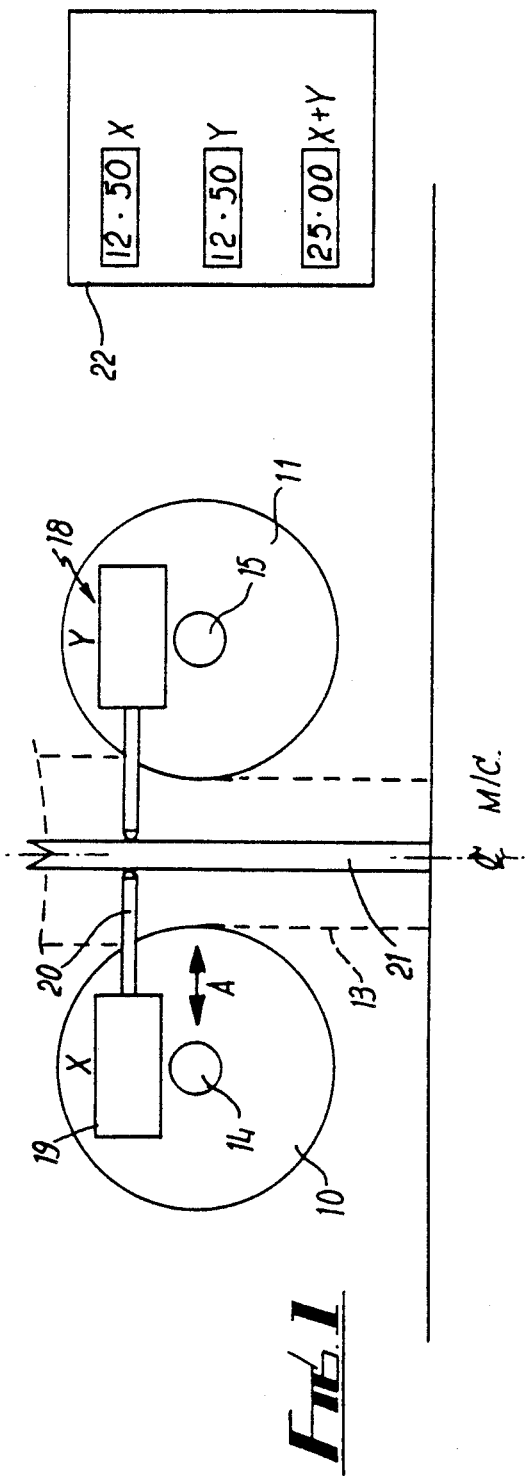

United States Patent [19]

Fraser

[11] Patent Number: 5,061,337
[45] Date of Patent: Oct. 29, 1991

[54] PRESSURE ROLLER ASSEMBLY

[75] Inventor: Neil S. Fraser, Elderslie, Great Britain

[73] Assignee: Stoddard Sekers International PLC, United Kingdom

[21] Appl. No.: 409,047

[22] Filed: Sep. 19, 1989

[30] Foreign Application Priority Data

Sep. 22, 1988 [GB] United Kingdom ............... 8822328

[51] Int. Cl.$^5$ ..................... G05G 15/00; B32B 31/00
[52] U.S. Cl. ..................... 156/351; 156/350; 156/358; 156/378; 156/470; 156/555; 156/64; 425/141; 425/367; 100/47; 226/177
[58] Field of Search ............. 156/350, 351, 358, 300, 156/378, 64, 470, 264, 555, 367, 72; 100/47; 425/367, 141; 33/657; 226/176, 177; 72/35

[56] References Cited

U.S. PATENT DOCUMENTS

| Re. 29,988 | 5/1979 | Hospied | 156/72 |
|---|---|---|---|
| 3,014,628 | 12/1961 | Littlehale | 226/177 |
| 3,358,485 | 12/1967 | Caro et al. | 100/47 X |
| 3,509,815 | 5/1970 | Lloyd | 100/47 |
| 3,691,069 | 9/1972 | Walser | 156/72 |
| 3,902,114 | 8/1975 | Alich | 72/35 X |
| 4,063,363 | 12/1977 | Harlow | 33/657 |
| 4,481,065 | 11/1984 | Clausen et al. | 156/470 X |
| 4,845,970 | 7/1989 | Schmitz | 72/35 X |

Primary Examiner—William A. Powell
Assistant Examiner—J. Sells
Attorney, Agent, or Firm—Ratner & Prestia

[57] ABSTRACT

Pressure rollers are carried on respective shafts which are slidable in slotted plates towards and away from a machine centreline to define a gap. Measuring means are provided for determining the position of each roller, in the form of a contact probe mounted on each end of each shaft with the probes at either end bearing on opposite faces of a plate of known thickness centred on the machine centreline.

4 Claims, 2 Drawing Sheets

PRESSURE ROLLER ASSEMBLY

This invention relates to an assembly of opposed pressure rollers for exerting compressive force on a material passing between them. The invention applies particularly, but not exclusively, to the production of non-woven adhesive-bonded carpet.

U.S. Pat. No. 3,691,069 (now re-issued as U.S. Pat. No. Re 29,988) describes one known method of producing such carpet, in which a bellows-folded warp is adhered to two outer layers of backing material to form a sandwich web; the disclosure of the foregoing Patent being incorporated herein by reference. More specifically, the foregoing Patent relates to a process for manufacturing non-woven pile fabrics such as carpets and velvet comprising the steps of coating a face of each of two support sheets with a layer of adhesive; moving the support sheets in spaced relation with their adhesive layers opposed; feeding at least one continuous element into the space between said layers; deflecting the continuous element alternately toward the adjacent adhesive layers; driving the deflected element against the adhesive layer toward which it is deflected to attach the element alternately to the adhesive layers in folded configuration, said element being driven by pushing the element alternately on opposite sides thereof at a point along the element whose distance from the previous point of attachment of the element to the adhesive layer is approximately equal to the separation distance of the adhesive layers. Although not shown in the patent, it is necessary to apply compressive pressure to the sandwich web to ensure proper adhesive bonding, and in the known apparatus this is done by passing the sandwich web between opposed pressure rollers.

It is desirable that the pressure rollers be adjustable to deal with different thicknesses and densities of product. It is also desirable that the two pressure rollers be positioned equally about the centre line of the machine, to a high degree of accuracy, to ensure even pressure and uniform bonding. In prior art apparatus, the pressure rollers have been adjustable only by laborious manual adjustment of the roller mountings with the roller positions being checked by hand-held measuring instruments. This is time consuming and prone to error. Additionally, to subsequently check the positional accuracy of the rollers requires the apparatus to be stopped so that measurements can be made manually.

An object of the present invention is to provide a pressure roller assembly in which the foregoing deficiencies are overcome or mitigated.

The invention accordingly provides a pressure roller assembly comprising a frame, first and second rollers each mounted for rotation on a respective axle means, means mounting the axle means to the frame to dispose the rollers in parallel configuration, said mounting means providing limited adjustment of each axle means at each end of its roller in a common plane, measuring means for each said end fixedly postioned with respect to the adjacent roller centreline, and a reference member at each end of the roller defining a predetermined machine centreline between the rollers, the measuring means each operating to derive a signal representing the distance between the respective roller centreline and the machine centreline.

Each reference member is preferably a plate of known thickness and having its centre positioned on the machine centreline.

Preferably, each measuring means comprises a contact probe secured with respect to the roller and contacting said plate.

The contact probe may suitably be secured to a U-piece mounted on a split housing assembly which surrounds a roller shaft forming said axle means.

Figure 2:
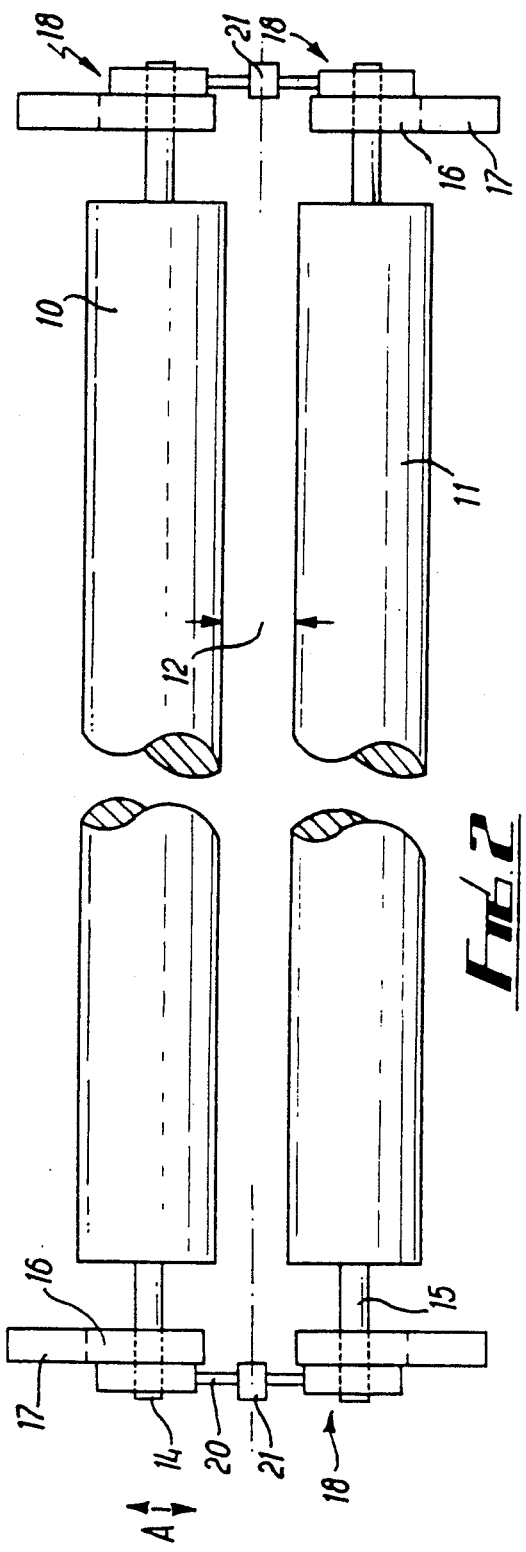
Figure 3:
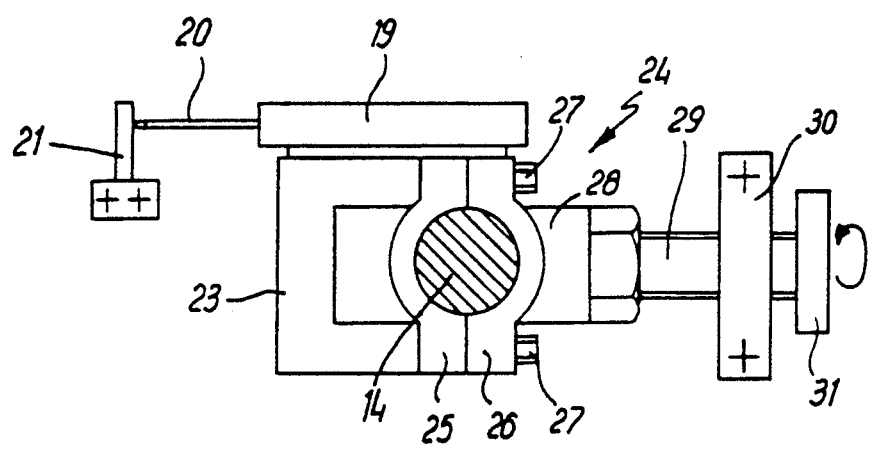

An embodiment of the invention will now be described, by way of example only, referring to the accompanying drawings, in which:

FIG. 1 is a schematic end elevation illustrating one embodiment of the invention, FIG. 2 is a schematic plan view corresponding to FIG. 1 but to a reduced scale, and FIG. 3 is an end elevation showing one part of the apparatus in greater detail.

Referring to FIGS. 1 and 2, a pair of pressure rollers 10 and 11 define a gap 12 for applying compressive pressure to a material, indicated at 13, passing between them. Each roller 10, 11 is mounted on a respective shaft 14, 15 which are horizontally slidable in slots 16 formed in frame members 17. Means (described in detail below) are provided for positioning each end of each shaft 10, 11 in the horizontal direction as indicated by arrow A.

A measuring probe 18 is mounted (as described below) at each end of each shaft 14, 15 so as to be in fixed relation to the shaft axis. The probes 18 are of known type, comprising a housing 19 from which extends an elongate probe member 20 spring biased outwardly of the housing 19. The probes at a given end of the rollers 10, 11 are aligned horizontally with their probe members contacting a reference plate 21 of accurate thickness and accurately centred on the machine centreline.

Probes of this are known per se and are commercially available, e.g. from Force Measurement Systems Limited of Hillington, Glasgow. Each probe gives an electrical output which is a function of extension and retraction of the probe member 20 with respect to a datum position. In a preferred arrangement the two probes 18 at each end of the apparatus are connected to a read-out panel 22. The rollers are then set accurately to a spacing equal to the thickness of the reference plates 21, typically 10 mm, and the read-outs set to show 5 mm for each probe. The rollers can then be readily set to a desired spacing with a high degree of accuracy and parallelism by adjusting the roller mountings until the required read-outs are obtained. For example, for a roller spacing of 25 mm the rollers are adjusted until the read-out from each probe is 12.5 mm.

FIG. 3 shows in greater detail a preferred method of mounting a probe 18. The probe housing 19 is secured to a U-piece 23 which is in turn secured to a split housing assembly 24. The split housing assembly 24 comprises two semi-circular members 25, 26 encircling the roller shaft 14 and secured together by bolts 27. The member 26 is formed with a radially projecting boss 28 from which extends a threaded rod 29. The latter extends through a support nut 30 secured to the machine frame, and can be turned at 31 to produce translational movement of the shaft 14 with respect to the machine centreline. The use of split housing assemblies such as 24 allows the probes to be attached to and removed from the machine while it is operating, for example for servicing or replacement.

I claim:

1. A pressure roller assembly comprising a frame, first and second rollers each mounted for rotation on a respective axle means, means mounting the axle means to the frame to dispose the rollers in parallel configuration, said mounting means providing limited adjustment of each axle means at each end of its roller in common plane, measuring means for each said end fixedly positioned with respect to the adjacent roller centreline, and a reference member at each end of the roller defining a predetermined machine centreline between the rollers, the measuring means each operating to provide a signal representing the distance between the respective roller centreline and the machine centreline.

2. A pressure roller assembly according to claim 1, in which each reference member is a plate of known thickness having its centre positioned on the machine centreline.

3. A pressure roller assembly according to claim 2, in which each measuring means comprises a measuring probe secured with respect to the roller and contracting said plate.

4. A pressure roller assembly according to claim 3, in which each contact probe is secured to a U-piece mounted on a split housing assembly which surrounds a roller shaft forming said axle means.

* * * * *